Sept. 3, 1940.   F. F. C. RIPPON   2,213,411
SPELLING TOY
Filed June 14, 1939
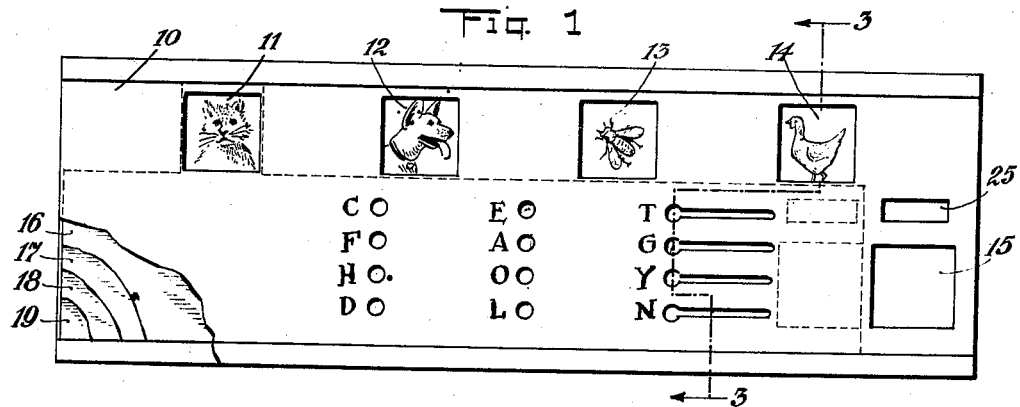
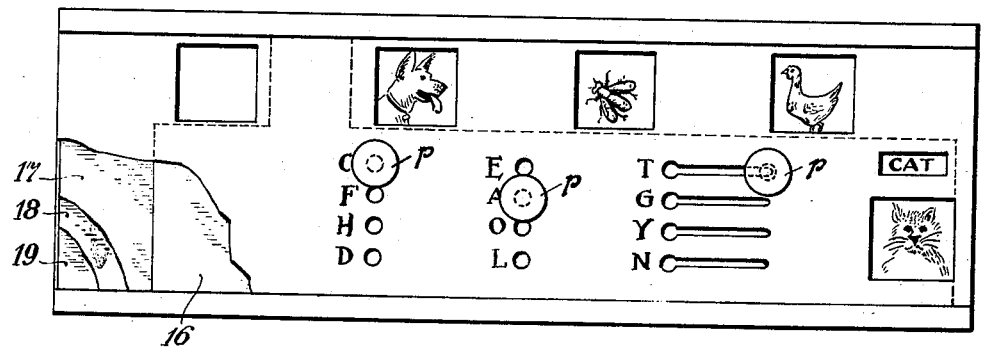
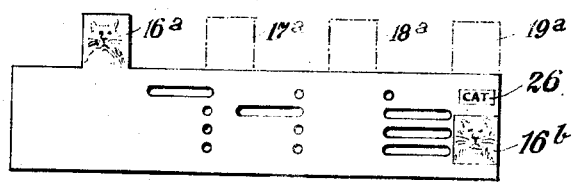
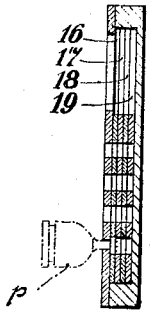
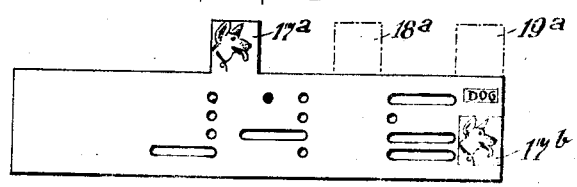
INVENTOR.
Francis Felix Claude Rippon
BY John W. Hoag
ATTORNEY.

Patented Sept. 3, 1940

2,213,411

UNITED STATES PATENT OFFICE 2,213,411

SPELLING TOY

Francis Felix Claude Rippon, New York, N. Y.

Application June 14, 1939, Serial No. 279,164

8 Claims. (Cl. 35—9)

This invention relates to a toy and particularly to one in which indicia such as pictorial representations of various objects are presented to the player with the challenge to correctly identify them, as for example by spelling their names, and means are provided for immediately testing the correctness of the identification.

In carrying out my invention I provide a device in which the identity of an object initially exposed to view may be indicated by inserting pegs in apertures each corresponding to indicia, such for example as letters of the alphabet, and the correctness of the identification may be determined as soon as the peg indicating the last letter of the name has been inserted by attempting to move the peg laterally. In the embodiment of my invention described herein a number of objects to be identified are provided on separate slides which are contained in superimposed position in an elongated box like container. The container is provided with a number of windows and the said objects on the slides are positioned differentially for each slide so that initially each of the objects is exposed to view through one of the windows. The container is provided with a number of columns of letters of the alphabet and corresponding peg-receiving apertures, the right hand column of apertures being slots and the letters of each name being arranged in sequence from left to right i. e. the first letter of each name is disposed in the left hand column and successive letters in successive columns to the right so that the last letter of each name will be in the extreme right hand column. The slides are provided with apertures adapted to be in register with the apertures in the container when the slides are superimposed in position, but each slide differs from each other slide in that, in the columns preceding the last, each aperture corresponding to letters in the name of the object to be identified, carried by that slide, is slotted, while in the last column each aperture is slotted except the one corresponding to the last letter in the name of the object to be identified. It will thus be seen that a peg inserted in an aperture in the container will also extend through an aperture in each of the slides; that the apertures of the columns preceding the last, of the container, are unslotted, while in the said columns on each slide only the apertures corresponding to letters precedent to the last letter, of the name of the object carried by that slide, will be slotted and the rest unslotted; and that of the last column of apertures, those of the container will all be slotted, while in each slide all the apertures will be slotted except the one corresponding to the last letter of the name of the object carried by that slide.

Thus when pegs are correctly inserted in apertures in the columns preceding the last i. e. the column on the extreme right hand side as illustrated herein, they will engage and prevent relative movement of all of the slides except the one bearing the apertures corresponding to the letters preceding the last letter of the name of the object to be identified, whereas the peg correctly inserted in the last column will encounter a slot in the container and in each of the slides except the one bearing the object to be identified. Thus the slide bearing the object to be identified may be moved relatively to the other slides and to the container by urging the peg, correctly inserted in an aperture in the last column, along the slot provided in the container. All the rest of the slides, which would otherwise tend to move together due to their frictional contact with one another in superimposed position, will be held against movement by pegs correctly inserted in the columns of apertures preceding the last column.

In using the embodiment of my invention disclosed herein the user will be instructed that the first letter of the name of the object to be identified will be found in the first—i. e. the right hand column, as illustrated herein,—the second letter in the second column, etc. and that in attempting to spell any name the pegs should be inserted in the column of apertures from left to right.

It will be understood that the phraseology employed herein is for the purpose of description and not for limitation and that various modifications of the embodiment of the invention described herein may be made within the scope of the invention.

The invention will best be understood if the following description is read in connection with the drawing in which:

Figure 1 is a top view of the toy;

Figure 2 is a similar view of the toy after one of the objects initially presented has been correctly identified;

Figure 3 is a vertical section taken on line 3—3 of Figure 1;

Figure 4 is a plan view of one of the removable indicia bearing members contained in the toy; and Figure 5 is another of the indicia bearing members.

The numeral 10 refers to a container having therein windows 11, 12, 13, 14, and 15. In the face of the container there are also provided three vertical rows of perforations identified respectively by the letters of the alphabet as follows: first row C, F, H, D; second row E, A, O, I; and third row, consisting of slots T, G, D, K. The letters chosen will of course depend upon the objects to be identified. Some letters not required to spell the name of any of the objects may be used to increase the chances of error thus making the toy more interesting. The letters or other indicia identifying the peg receiving apertures may be removable and interchangeable so that the device can be used for a wide range of objects.

Within the container as illustrated are four superimposed indicium bearing members or slides 16, 17, 18, and 19 which do not fill up the full width of the container and are accordingly slideable laterally. Each slide has thereon a picture representing an object, such as an animal, the name of which is to be spelled, positioned so that initially it is exposed through one of the windows 11, 12, 13, or 14 of the container but is not visible through window 15, and may have a second picture of the same object which is initially hidden. As illustrated, the slides have the upwardly extending tabs 16a, 17a, 18a, and 19a respectively, each bearing a picture initially exposed through windows 11, 12, 13, and 14 respectively, and the replicas, as illustrated by 16b and 17b, Figures 4 and 5, of the same pictures located at the extreme right hand edge of the respective slides 16, 17, 18, and 19, in line with window 15, so that when a slide is moved to the right the length of the slots in the container, the said replicas will be respectively exposed through window 15 and the corresponding tabs 16a, 17a, 18a, or 19a will be moved out of alignment with windows 11, 12, 13, and 14 respectively.

Each of the slides 16, 17, 18, and 19 is provided with rows of perforations, equal in number to those in the container, representing the same letters of the alphabet as those shown on the container, and distributed so that they will initially be in register with the corresponding respective perforations in the container. However, it will be noted that the perforations in a slide corresponding to the letters in the name of the object pictured thereon, except the last or right hand row, are extended to the left of the perforations in the same columns corresponding with other letters in the alphabet, forming slots, while in the last or right hand column, the perforations corresponding with the last letter of the object pictured thereon is unslotted whereas the remaining perforations in that column are slotted to the right.

The spelling of the name of the object pictured on any slide is identified by placing pegs p from left to right in one perforation of each column, each of which contains one of the letters of the alphabet which correctly spell the name arranged in sequence from left to right. After inserting pegs to indicate the first and intermediate letters of the name of the object being identified the player inserts the peg in the aperture corresponding to the letter which he believes to be the last letter of the name and moves the peg to the right. If he has correctly spelled the name the pegs, identifying the first and intermediate letters of the name being spelt, will extend through unslotted apertures in the slides bearing objects other than the one being identified and will be inserted in a slotted perforation in the slide bearing the picture of the object being spelt, and the peg identifying the last letter of the name being spelt will be engaged in an unslotted aperture in said slide, and thus the particular slide may be moved to the right while the other slides are held stationary.

The pegs p are preferably somewhat larger at either extremity than at the middle or shank portion so that after being inserted in the enlarged portion of the slots they will be retained and readily slideable in the narrower portion of the slots until returned to the enlarged portion thereof when they can be withdrawn.

It will be seen that in spelling the word "cat" the shank of a peg inserted in the perforation in the container corresponding to the letter "C" in the first column will enter and engage an unslotted aperture in each of the slides except the one bearing the picture of the cat, the aperture of which is slotted to the observer's left. Similarly a peg placed in the perforation marked "A" in the middle column will engage an unslotted aperture in each of the cards except the one bearing the picture of the cat, the aperture of which is slotted to the left. On the other hand a peg inserted in the aperture in the container corresponding with the letter "T" in the last column (the one on the observer's extreme right) of perforations, which is slotted to the right, will enter slotted apertures (slotted to the right) in each of the slides except the one bearing the picture of a cat, the engaged aperture of which is unslotted. Slide 16 bearing the two figures of a cat will thus be free to move to the right the length of the slot in the container without moving any of the slides except the one bearing the picture of the cat. The unslotted aperture in the last column in slide 16 will be engaged by the shank of a peg p and will be moved with the peg to the right, causing the second picture 16b to be exposed through the window 15. At the same time the lateral displacement of slide 16 will remove the tab 16a from alinement with window 11.

If desired a further window 25 may be provided above window 15 and the name of the object to be spelled may be printed on the slide at 26 so that it will appear at this window simultaneously with appearance at window 15 of the picture of the object, thus confirming the correctness of the spelling which is indicated when the slide bearing the object moves to the right and the object appears at window 15.

It will be understood that if the pegs are placed incorrectly it will be impossible to move the slide bearing the picture of the object being identified, since, if a peg is placed in the wrong perforation in any column other than the last it will engage unslotted perforations in the slide bearing the object being spelled and in the container, thus locking the slide against lateral displacement. If the last letter in the name is misspelled the peg representing the last letter will encounter a slot in the card bearing the object the name of which is being spelled as well as in the container, and will therefore be powerless to displace laterally the desired card.

While objects having only three letters in their names have been illustrated obviously objects with shorter or longer names have been illustrated obviously objects with shorter or longer names may be chosen, and additional columns of letters may be employed.

What I claim is:

1. A toy comprising a container, a number of superimposed slides therein, a number of slotted and unslotted apertures in the container and in each slide arranged in corresponding manner representing indicia relating to other predetermined indicia, associated with respective slides to be identified, pegs for insertion in the said apertures, the said slotted and unslotted apertures being distributed so that when pegs are inserted in the apertures in the container representing indicia relating to any of said predetermined indicia the pegs will engage and retain in fixed position all of the slides except one.

2. A toy comprising a container having a number of superimposed slides therein, a number of slotted and unslotted apertures in the container and in each slide, arranged in columns, representing indicia relating to other predetermined indicia to be identified, and which are associated with the respective slides, pegs for insertion in the said apertures, the said slotted and unslotted apertures being distributed so that all of one column of apertures in the slides will be slotted except in the slide representing an indicium to be identified, the corresponding aperture of which will be unslotted.

3. A toy comprising a container having a number of superimposed slides therein, a number of slotted and unslotted apertures in the container and in each slide, arranged in columns, representing indicia relating to other predetermined indicia to be identified, and which are associated with the respective slides, pegs for insertion in the said apertures, the said slotted and unslotted apertures being distributed so that all of one column of apertures in the slides will be slotted except in the slide representing an indicium to be identified, the corresponding aperture of which will be unslotted and all of the other columns of apertures in the container will be unslotted, and all of the corresponding apertures in the slides will be unslotted except in the slide representing an indicium to be identified, the corresponding aperture of which will be slotted.

4. A toy comprising a container, a number of superimposed indicia bearing slides in the container, a number of peg receiving apertures arranged in groups in the container representing indicia some of which relate to the indicia on said slides, the apertures of one group being slotted, a number of peg receiving apertures in said slides arranged in groups equal in number to the groups in said container and adapted to be initially in register therewith, the apertures of each slide representing the same indicia as the corresponding apertures in the container, those apertures in each slide representing the indicium carried by that slide being slotted except in a predetermined group of said apertures, initially in register with the group of slots in the container, in which all the apertures except the one relating to the indicium carried by the slide is slotted, and pegs insertable in the apertures in the container and in the apertures in the slides in register with the said apertures in the container for identifying the indicium carried by any of said slides whereby all of the slides will be held stationary by the pegs except a slide the indicium on which has been correctly identified.

5. A toy comprising a container having a number of windows, a number of superimposed indicium bearing slides in said container positioned so that the indicium on each slide is initially exposed through one of said windows, a number of columns of letters of the alphabet on the container including the letters required to spell the name of the indicium on each of the slides, each letter having a peg receiving aperture associated therewith in the container and in the slide, the groups of apertures in the container preceding the last group being unslotted and the last group in the container being slotted, the apertures of the groups of apertures in each of the slides preceding the last group which relate to letters which spell the name of the indicium on that slide being slotted, and all of the apertures in the last group, except the one representing a letter which relates to the said indicium, being slotted, the said groups of apertures in the slides being initially in register with corresponding groups of apertures in the container, and pegs for insertion in said apertures to spell the name of the indicium on any of said slides, whereby all of the slides, except one the name of which has been correctly spelled, will be held in fixed position in the container allowing the one the name of which has been correctly spelled to move when the peg identifying the last letter of the name is moved along the appropriate slot in the container.

6. A toy comprising a container having a number of windows and a number of superimposed slideable members each having an indicium initially exposed through one of the windows of said container and having a replica of said indicium initially concealed but exposeable through another window of said container when the slide is displaced relatively to the container and other slides, each of said members having therein one or more slots representing one or more letters contained in the name of the indicium thereon, and an unslotted aperture representing one of the letters in the name of the indicium carried by said member, the said unslotted aperture of each member being in register with a slot in each of the other members and in said container, apertures in the container initially in register with the slots and apertures in the said members and pegs insertable in the apertures in the container to identify the indicium in any one of said members whereby all of the members except one, the indicium on which has been properly identified, will be locked against movement relative to the container or other slides, and whereby the member the indicium on which has been properly identified may be moved laterally with the peg inserted in the unslotted aperture in said member thereby exposing to view the said replica of the indicium carried by the said member.

7. A spelling toy comprising a number of slides each bearing two pictures of an object to be spelled, a container having a number of windows through which respectively one of the pictures on each slide is initially visible, and an additional window which is initially blank, but through which the second picture on said slides may be exposed when the slides are moved relatively to the container, a number of letters of the alphabet indicated on the face of the container each having a peg receiving aperture, a number of pegs for insertion in said apertures to indicate the spelling of the name of any of the objects initially visible through the windows of said container, the aperture in the container representing the last letter in the name of each of said objects being elongated forming a slot adapted to serve as a slideway for one of said pegs, each of said slides having slots or unslotted apertures initially in register with each of the slots and unslotted apertures in the container, the said slots and unslotted apertures being distributed so that the apertures in each slide initially in register with the apertures in the container representing all but the last letter of the same of the picture carried by said slide are slotted, while the aperture in the slid initially in register with the slot in the container representing the last letter of the name of the picure carried by said slide is unslotted, wherby upon corrctly spelling the name of the picture on any one of the slides by inserting the pegs in the proper places, and moving the peg, representing the last letter of the name, in the slot in the container, the slide bearing the correctly spelt picture may be moved sufficiently for the second picture carried by the slide to be exposed through said initially blank window while the other slides are retained in place.

8. A toy comprising a container, a picture bearing slide in the container of a size permitting it to be moved relatively to the container, a number of apertures in the container representing letters of the alphabet, at least one aperture representing a letter in the name of the picture on said slide being slotted, a number of slotted and unslotted apertures in said slide arranged so that a slotted aperture in the slide will initially be in register with an unslotted aperture in the container representing a letter in the name of the picture in the slide, and an unslotted aperture in the slide will initially be in register with each slotted aperture in the container representing a letter in the name of the picture on the slide, pegs for insertion in the apertures in the container and extending into the registering apertures in the slide whereby if the pegs are placed only in apertures representing letters correctly spelling the name of the picture on the slide the said slide may be moved in the container a distance equal to the length slots in the container and slide in which pegs are inserted.

FRANCIS FELIX CLAUDE RIPPON.